(12) United States Patent
Szarvas et al.

(10) Patent No.: US 7,830,572 B2
(45) Date of Patent: Nov. 9, 2010

(54) HOLOGRAPHIC STORAGE SYSTEM BASED ON COMMON PATH INTERFEROMETRY

(75) Inventors: Gabor Szarvas, Budapest (HU);
Szabolcs Kautny, Budapest (HU);
Laszlo Domjan, Budapest (HU);
Svenja-Marei Kalisch, Ganderkesee (DE)

(73) Assignee: Thomson Licensing, Boulogne-Billancourt (FR)

( * ) Notice: Subject to any disclaimer, the term of this patent is extended or adjusted under 35 U.S.C. 154(b) by 417 days.

(21) Appl. No.: 11/818,282

(22) Filed: Jun. 13, 2007

(65) Prior Publication Data

US 2007/0297030 A1    Dec. 27, 2007

(30) Foreign Application Priority Data

Jun. 27, 2006    (EP) .................................. 06116126

(51) Int. Cl.
*G03H 1/12* (2006.01)
(52) U.S. Cl. .............................. 359/11; 359/22; 359/29; 369/103
(58) Field of Classification Search .................. 359/22, 359/24, 29, 11; 369/103
See application file for complete search history.

(56) References Cited

U.S. PATENT DOCUMENTS

| | | | |
|---|---|---|---|
| 6,021,223 A * | 2/2000 | Toyoda et al. | 382/214 |
| 6,911,637 B1 * | 6/2005 | Vorontsov et al. | 250/201.9 |
| 2004/0016897 A1 | 1/2004 | Stokowski et al. | |
| 2006/0152783 A1 * | 7/2006 | Butler et al. | 359/24 |

FOREIGN PATENT DOCUMENTS

WO    WO 2004/112045    12/2004

OTHER PUBLICATIONS

Search Report dated Nov. 15, 2006.

* cited by examiner

*Primary Examiner*—Alessandro Amari
(74) *Attorney, Agent, or Firm*—Robert D. Shedd; Harvey D. Fried; James McKenzie

(57) ABSTRACT

The present invention relates to a holographic storage system, and more specifically to a holographic storage system using a phase spatial light modulator.

According to the invention a holographic storage system with a phase SLM for imprinting a 2-dimensional phase data pattern onto an object beam includes a common path interferometer for converting the phase data pattern of the object beam into an intensity data pattern.

10 Claims, 7 Drawing Sheets

HOLOGRAPHIC STORAGE SYSTEM BASED ON COMMON PATH INTERFEROMETRY

This application claims the benefit, under 35 U.S.C. §119 of European Patent Application 06116126.1, filed Jun. 27, 2006.

FIELD OF THE INVENTION

The present invention relates to a holographic storage system, and more specifically to a holographic storage system using a phase spatial light modulator.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array. A straightforward example of an SLM is an amplitude SLM, where the pixels with the value '0' block the light, and the pixels with the value '1' transmit or reflect it. In a simplified view, this means that the amplitude SLM has black and white pixels. Supposing an equal probability for the black pixels and the white pixels, about 50% of the object beam power is blocked. The blocked light is wasted and decreases a writing data rate. If, in addition, low white rate codes are applied, which is often the case in the field of holographic storage, the light loss for the object beam is even more than 50%. For example, using a 20% white rate code the light loss is about 80%.

The above problem is overcome by using a phase SLM for imprinting the information into the object beam. In this case a phase shift of '0' and 'π' of the pixels corresponds to information bits '0' and '1' (or vice versa) of the input data array, respectively. The phase shift of 'π' corresponds to an optical path difference of $\lambda/2$, where $\lambda$ is the wavelength of the object and the reference beam. Of course, it is likewise possible to apply further intermediate phase shifts. As no light is blocked, there is no light loss when a phase SLM is used for imprinting of the information onto the object beam. However, as the detector array can only detect the light intensity, the phase distribution of the reconstructed object beam has to be converted into an intensity distribution before the light impinges on the detector array.

WO 2004/112045 discloses a holographic storage system, in which a phase contrast filter is placed in the readout beam path to convert the phase modulation into an amplitude modulation, which is detected by an array detector.

In WO 02/49018 and WO 02/03145 a phase SLM is provided for imprinting the information onto the object beam. For converting a reconstructed phase distribution into an intensity distribution, the interference of a reflected reference beam with the read-out beam is used. On the detector surface the reference beam reflected from the surface of the holographic storage medium is a plane wave with a constant phase, while the read-out beam is a binary phase modulated beam. The interference of these two beams is a binary intensity distribution. This solution requires that the interfering beams have similar amplitudes. If the amplitudes are significantly different, the visibility of the intensity distribution of the interference pattern is very low. In case of multiplexing, however, the diffraction efficiency for the read-out beam is only $10^{-4}$ to $10^{-6}$, i.e. the intensity difference between the interfering beams is 4-6 orders of magnitude. This means that the solution is not applicable to holographic storage systems using highly multiplexed holograms, as the visibility and the signal-to-noise ratio are very low.

SUMMARY OF THE INVENTION

It is an object of the invention to propose a holographic storage system using a phase SLM, which overcomes the above drawbacks.

According to the invention, this object is achieved by a holographic storage system with a phase SLM for imprinting a 2-dimensional phase data pattern onto an object beam, which includes a common path interferometer for converting the phase data pattern of the object beam into an intensity data pattern.

Similarly, a method for holographic data storage has the steps of:
  imprinting a 2-dimensional phase data pattern onto an object beam using a phase SLM; and
  converting the phase data pattern into an intensity data pattern using a common path interferometer.

According to the invention, the phase contrast method as developed for phase contrast microscopy is applied to the holographic storage system. A simple optical arrangement is placed into the path of the recording object beam for converting the phase distribution imprinted on the object beam by the phase SLM into an intensity distribution. This optical arrangement constitutes a common path interferometer. The solution according to the invention allows to substantially increase the data transfer rate compared to a holographic storage system using an amplitude SLM. The writing time can be 4 to 5 times shorter than the writing time with the amplitude SLM. Using a phase SLM in combination with the phase contrast method for converting the phase data pattern into an amplitude data pattern, the light efficiency improves inversely proportional to the employed white rate. The use of common path interferometry requires somewhat stricter tolerances for the cover glass homogeneity and mechanical properties of the phase SLM and the other optical elements. However, the required tolerances may be reduced in practice by an optimized conversion function of the phase contrast method.

Preferably, the common path interferometer includes a phase contrast filter with a nonlinear conversion. In case of a 12f holographic storage system with three confocally arranged Fourier planes, the phase contrast filter is advantageously inserted in a first Fourier plane of the 12f optical system. Using an appropriate shape and phase distribution, this phase contrast filter converts the phase data pattern of the phase SLM into an intensity data pattern. As the phase data pattern is binary, the nonlinear conversion allows to realize a robust, error insensitive storage system.

Advantageously, the phase contrast filter has an inner circular area for shifting the phase of a central part of the Fourier transform of the object beam by a first value, and an annular area surrounding the inner circular area for shifting the phase of an outer part of the Fourier transform of the object beam by a second value. In this way a step-like (binary) conversion is achieved. Preferably, the difference between the first value and the second value amounts to a relative phase shift of '$\pi$'. The relative phase shift of '$\pi$' leads to an optimum contrast of the intensity data pattern. However, other relative phase shifts can also be realized, as the results are not too sensitive to the exact relative phase shift value.

Preferably, the phase contrast filter further has an outer blocking area for low pass filtering the Fourier transform of the object beam. The numerical aperture of a Fourier objective is limited. In the Fourier space this means that the space-frequency bandwidth of the objective is limited. The objectives are optimized only for this limited space-frequency area. The outer blocking area of the filter realizes this limit. In addition, for a good visibility the energy content of the wavefronts interfering in the common path interferometer have to be approximately the same. By adjusting the diameter of the outer blocking area the energy of the outer part of the Fourier transform of the object beam can be controlled. A further advantage is that a smaller outer diameter of the annular area leads to a decrease of the hologram size. As a consequence, the data density increases.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
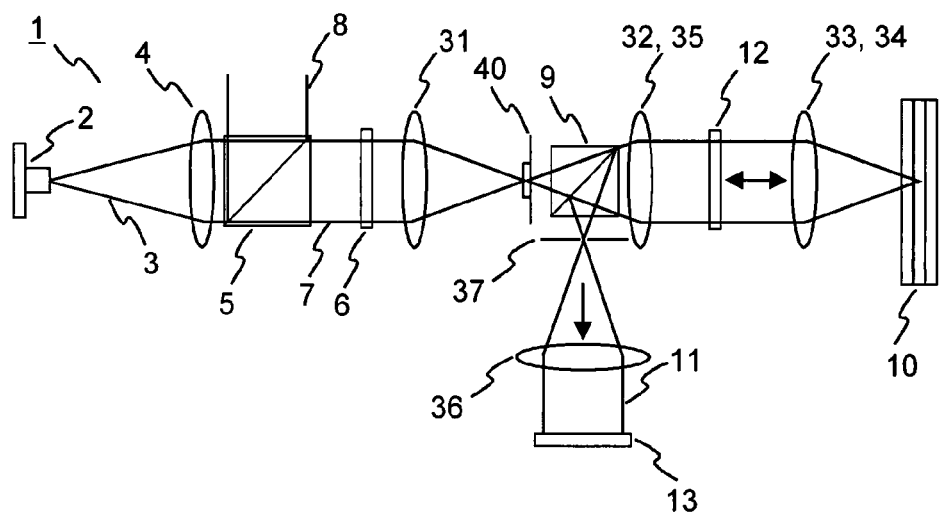
FIG. 1 schematically depicts a holographic storage system.

In holographic data storage digital data are stored by recording the interference pattern produced by the superposition of two coherent laser beams. A general exemplary setup of a 3×4f (12f) holographic storage system is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A phase spatial light modulator (SLM) 6 modulates one of the two beams, the so called 'object beam' 7, to imprint a 2-dimensional phase data pattern. The path of the second beam, the so called 'reference beam' 8, is omitted in the figure for simplicity. The object beam 7 is Fourier transformed by a Fourier objective lens 31. Located in the Fourier plane of the Fourier objective lens 31 is a phase shifter 40, which will be explained in more detail with reference to FIGS. 3 and 4. The Fourier transformed object beam 7 coming from the phase shifter 40 passes a polarization beam splitter 9, which does not act on the object beam 7, and a further Fourier objective lens 32. Finally, a quarter wave plate 12 rotates the direction of polarization of the object beam 7. For recording, both the object beam 7 and the reference beam 8 are focused into a holographic storage medium 10, e.g. a holographic disk or card, by a Fourier objective lens 33. At the intersection of the object beam 7 and the reference beam 8 an interference pattern appears, which is recorded in a photo-sensitive layer of the holographic storage medium 10.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by an objective lens 34 and passes through the quarter wave plate 12. The reconstructed object beam 11 is then directed onto a 2-dimensional array detector 13, e.g. a CCD-array, by the polarization beam splitter 9 via two Fourier objective lenses 35, 36 and a pinhole filter 37. The array detector 13 allows to reconstruct the recorded data.

Figure 2:
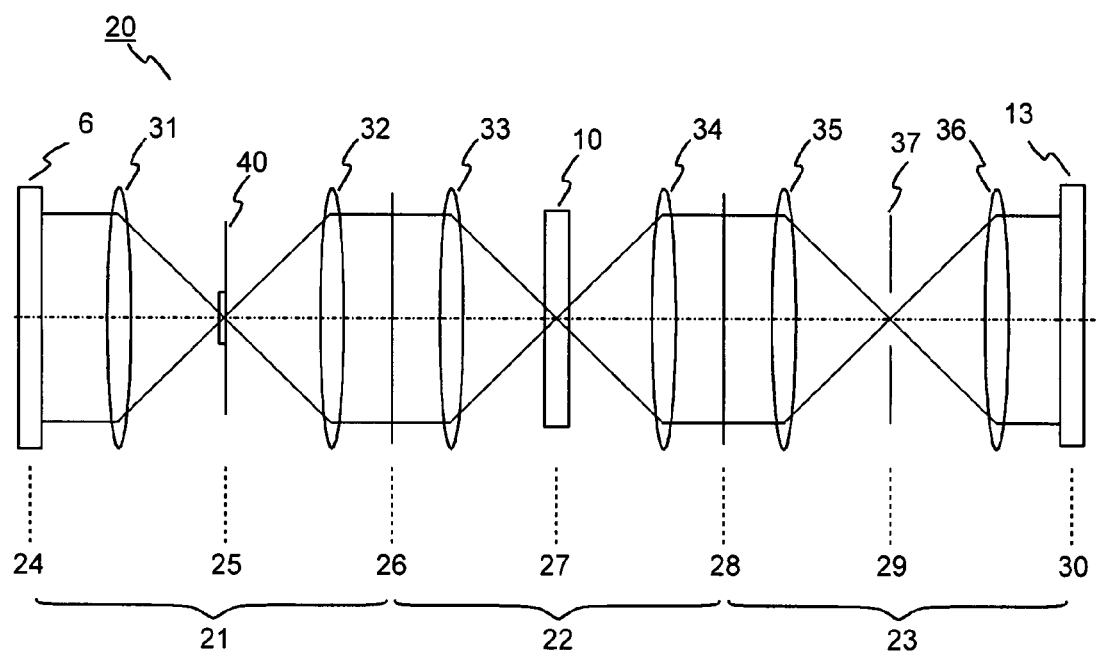
FIG. 2 depicts a simplified illustration of a 3×4f (12f) holographic storage system.

FIG. 2 shows a more simplified illustration of the 3×4f (12f) holographic storage system 20. For better clarity the folded system 20 is shown unfolded, and the polarizing beam splitter 9 is neglected. The 12f optical system 20 basically consists of three 4f systems 21, 22, 23, each having two Fourier objective lenses 31, 32, 33, 34, 35, 36. The phase SLM 6, e.g. a liquid crystal element, is arranged in the object plane 24 of the first 4f system 21. Two intermediate object/image planes 26, 28 are common planes for the first and second 4f systems 21, 22, and the second and third 4f systems 22, 23, respectively. The array detector 13 is located in the object plane 30 of the third 4f system 23. The 12f optical system 20 has three confocally arranged Fourier planes 25, 27, 29. Located in or close to the Fourier plane 25 of the first 4f system 21 is the special small size phase shifter 40, which shifts the phase of a small center area of the Fourier transform of the phase SLM 6, which is generated by the first lens 31 of the first 4f system 21, by '$\pi$'. Located in the Fourier plane 27 of the second 4f system 22 is the holographic storage medium 10, whereas the pinhole filter 37 is placed in the Fourier plane 29 of the third 4f system 23 for filtering the reconstructed object beam.

Figure 3:
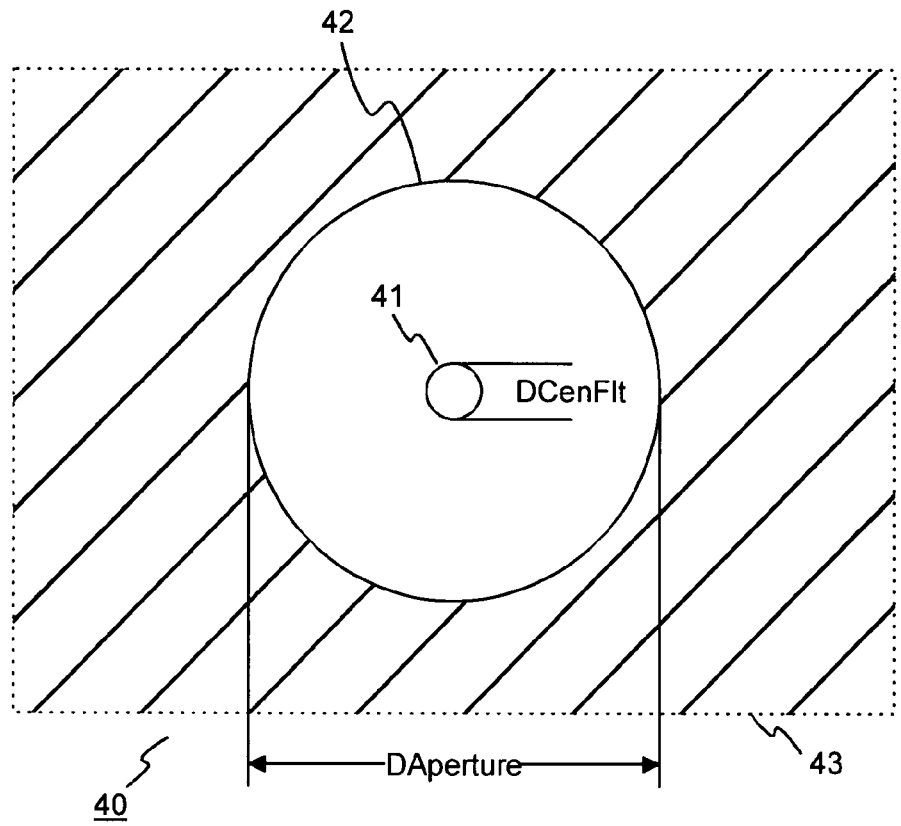
FIG. 3 shows a phase contrast filter according to the invention.

FIG. 3 shows the phase shifter 40 in more detail. The phase shifter or phase contrast filter 40 is located in the Fourier plane 25 of the first 4f system 21. It has two well-defined diameters. An inner circular area 41 with a diameter DCentFlt shifts the phase of the high intensity central part of the Fourier transform of the phase SLM 6, which is generated by the first Fourier objective 31 of the first 4f system 21, by '$\pi$'. A ring type region 42 of the phase shifter 40 between the inner diameter DCentFlt and an outer diameter DAperture has no effect on the Fourier components of the Fourier transform. It is to be noted, however, that it is likewise possible to have no phase shift in the inner circular area 41 and a phase shift of '$\pi$' in the ring type region 42, or any other combinations of phase shifts that add up to a relative phase shift of '$\pi$'. Finally, an outer area 43 starting at the diameter DAperture is opaque and blocks the higher order Fourier components of the phase SLM 6. In this way a low pass filtering of the Fourier transform of the phase SLM 6 is realized. Of course, the outer area 43 may likewise be reflective or absorbing, or block the higher order Fourier components by other means. Furthermore, instead of the blocking outer area 43 a separate filter aperture may also be used.

Figure 4:
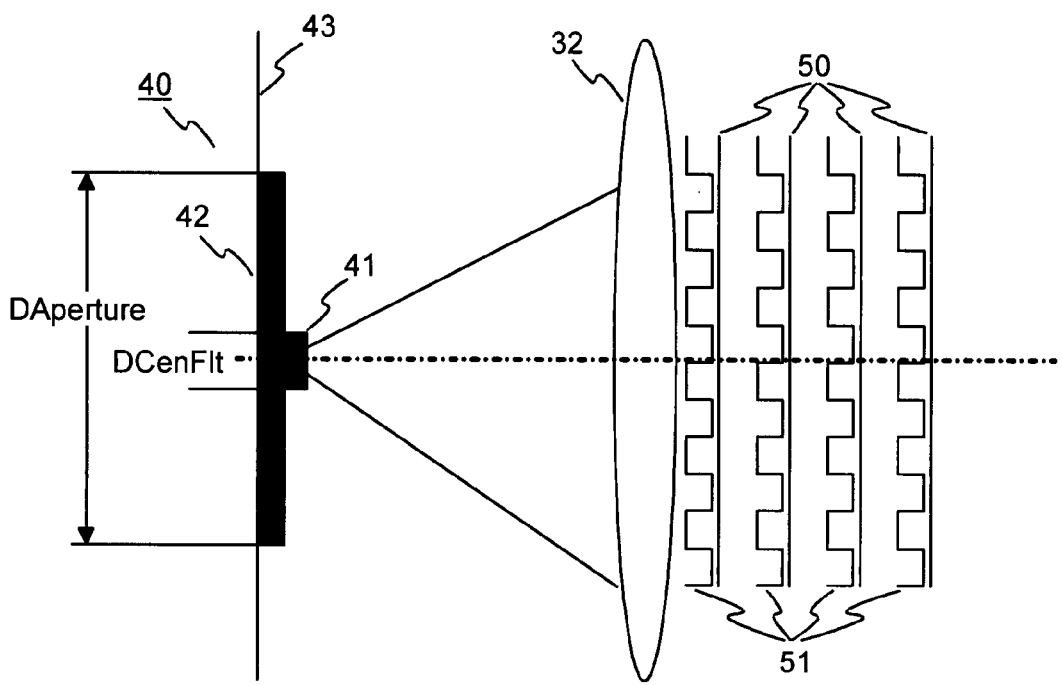
FIG. 4 shows a side view of the phase contrast filter, FIG. 5 schematically illustrates a method for holographic recording using the phase contrast filter.

A side view of the phase shifter 40 and the wavefronts 50, 51 back-transformed by the second Fourier objective 32 of the first 4f system 21 is shown in FIG. 4. After the second Fourier objective 32 the phase-shifted beam originating from the high intensity small central area 41 of the Fourier transform of the phase SLM 6 can be considered a homogenous plane wave at the intermediate image plane 26. This is indicated by the plane wavefronts 50. The back-transformed object beam originating from the ring-type area 42 is a binary phase distribution in the intermediate image plane 26, as indicated by the 'binary' wavefronts 51. The binary wavefronts 51 illustrate only a first approximation of the real situation. The wavefronts 51 coming from the ring-type area 42 are in fact more complicated. On the one hand the shape is not fully rectangular, as there are continuous transitions between the different regions. On the other hand, the different regions are not plane, but indented. The interference of the two beams leads to a nearly binary intensity distribution at the intermediate image plane 26. The phase shifter 40 thus converts the phase distribution into an intensity distribution.

In essence, the first 4f system 21 of the 12f optical system 20 forms a common path interferometer, as known, for example, from phase contrast microscopy. However, in phase contrast microscopy a linear conversion is used. In the articles J. Glückstad, P. C. Mogensen: "*Optimal phase Contrast in common path interferometry*", Appl. Opt. Vol. 40, pp 268-282, and P. C. Mogensen, J. Glückstad: "*Reverse phase contrast: an experimental demonstration*", Appl. Opt. Vol. 41, pp 2103-2110, the conversion of a phase image into an intensity distribution using common path interferometry is demonstrated. Basic equations are given for the visibility and the light efficiency for a linear conversion. In case of a linear conversion the intensity variation is proportional to the phase variation in the range from '0' to '$2\pi$'.

The phase shifter 40 according to the invention does not perform a linear conversion, but a non-linear, preferably step-like (binary) conversion. This conversion function is optimized by using appropriate inner and outer diameters DCentFlt and DAperture for the phase shifting elements. The step-like conversion allows to realize a robust, error insensitive storage system.

Figure 5:
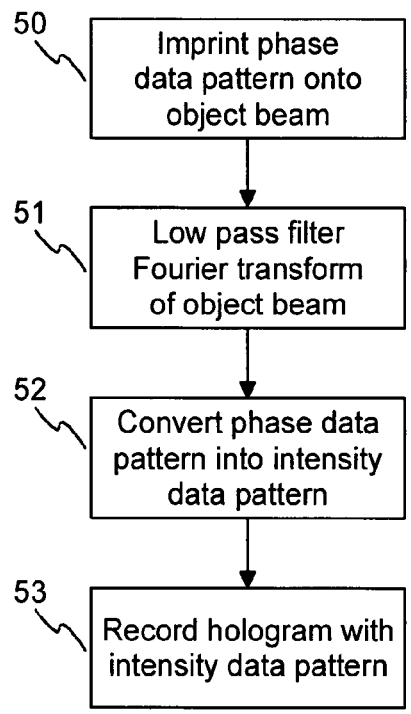

A method for holographic recording using the phase shifter 40 according to the invention is illustrated schematically in FIG. 5. After imprinting 50 a phase data pattern onto the object beam 7, the object beam 7 is low pass filtered 51 and the phase data pattern is converted 52 into an intensity data pattern. The filtering 51 and the converting 52 are advantageously performed in a single step by the phase shifter 40. The filtered and converted object beam 7 is then recorded 53 in the holographic storage medium 10.

Computer simulations illustrating the solution according to the invention are shown in FIGS. 6 to 9. The simulations are limited to the first 4f system 21 and do not cover the complete 12f optical arrangement 20. For simulating the Fourier transformation properties of the lenses 31, 32 the Fast Fourier Transformation (FFT) implemented in the MATLAB software was used. The phase SLM 6 was simulated by a 300× 300 matrix. Only a circular part of this matrix was filled with the binary values '+1' or '−1', because the usable area for the object plane of the Fourier objective 31 is circular. Other pixels of the matrix were filled with '0'. This means that no light originates outside the circular object area of the object plane. The '+1' values represent a phase shift of '0', the '−1' values represent a phase shift of '$\pi$'. It is to be noted that the figures show different data patterns. This is due to the fact that the program used for the numerical simulations does not store the matrices in order to reduce the memory requirements and increase the simulation speed. Neither the SLM matrix nor the intermediate matrices and the results are stored. Therefore, for each simulation step a new random input data pattern is generated.

Figure 6:
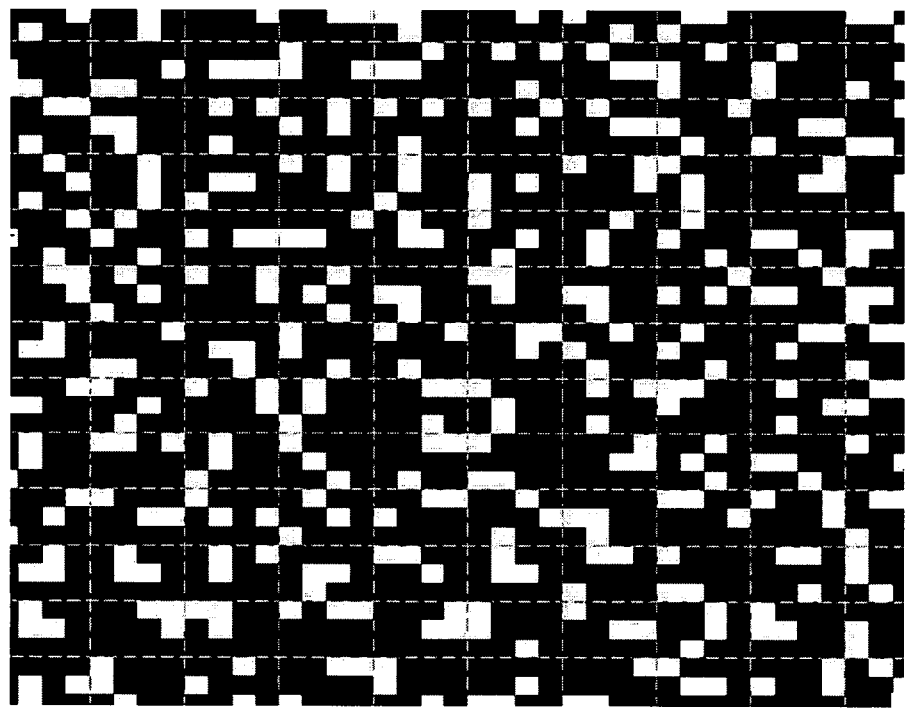
FIG. 6 shows an enlarged part of a phase SLM with symbolic black and white pixels.

FIG. 6 shows an enlarged part of the phase SLM 6 with symbolic black and white pixels. The white pixels of the image represent the phase SLM pixels with a phase shift of '$\pi$', the black pixels represent the phase SLM pixels with a phase shift of '0'. The matrix is over-sampled by a factor of '4' for the Fourier transformation. The matrix is then enlarged with a black (zero) frame. This step is required for eliminating aperture effects of the FFT algorithm.

Figure 7:
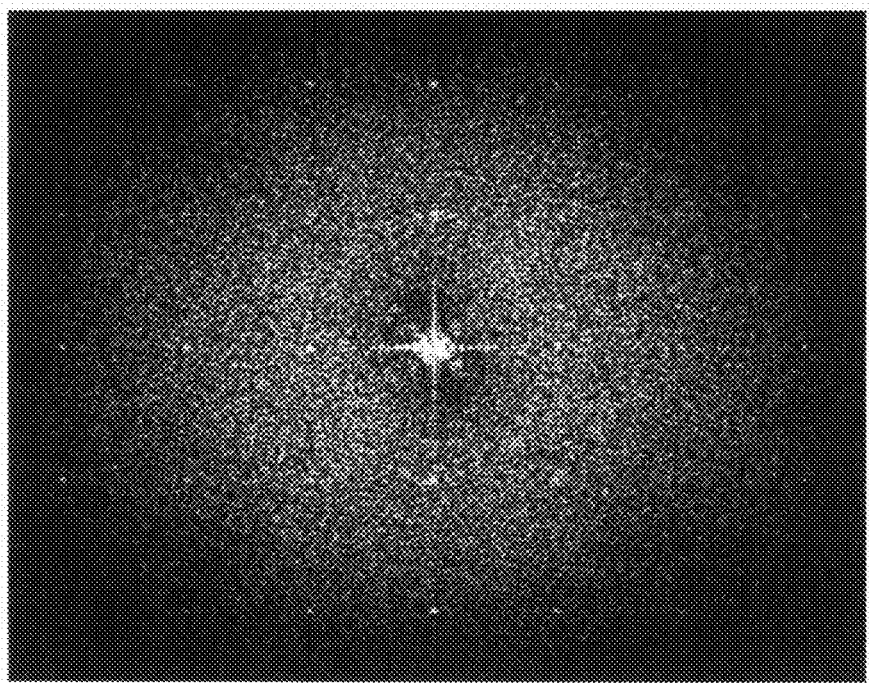
FIG. 7 illustrates the Fourier transformed image of the phase SLM after passing the phase contrast filter.

The Fourier transformed image of the phase SLM 6 after passing the phase contrast filter 40 is illustrated in FIG. 7. First a circular aperture with the diameter DAperture is applied to the Fourier transformed image to cut the high frequency components. This aperture determines the size of the Fourier transform at the first Fourier plane and constitutes a low pass filtering. In parallel with this low pass filtering, the low frequency components in the center of the Fourier transformed image are shifted by '$\pi$' with a phase-shifting filter with the diameter DCentFlt.

Figure 8:
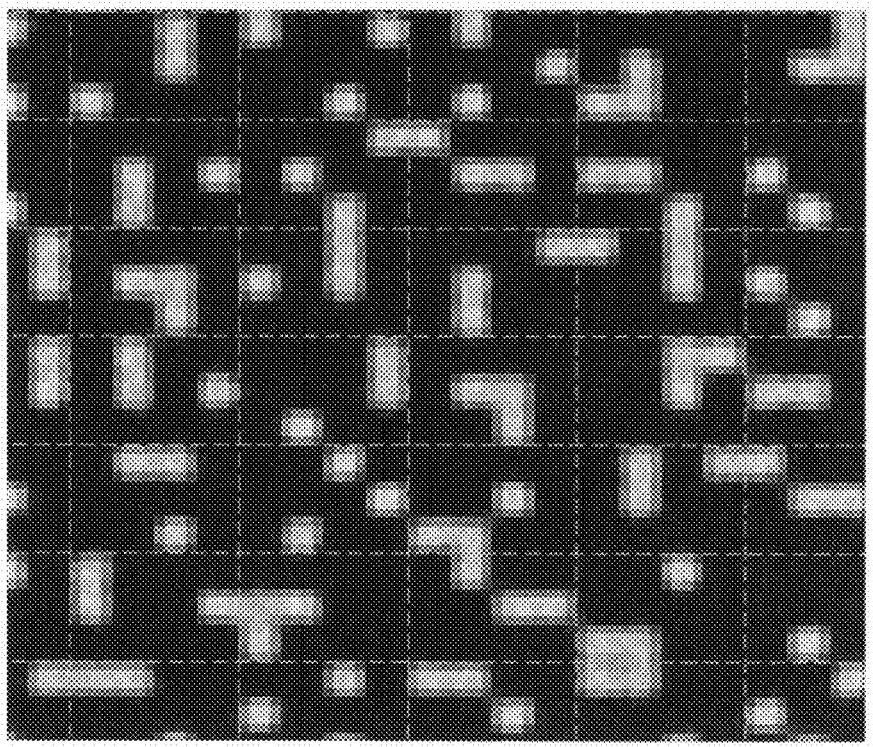
FIG. 8 shows the low pass filtered, phase shifted and back-transformed image of the phase SLM at an intermediate object/image plane.

FIG. 8 shows an enlarged part of the low pass filtered and phase shifted image of the phase SLM 6 at the intermediate object/image plane 26 after back-transformation by the Fourier objective 32. The black and white areas in this back-transformed image are actual intensity values obtained through the applied phase contrast method. As can be seen, the binary phase distribution of the phase SLM 6 is converted into a nearly binary intensity distribution at the intermediate object/image plane 26 due to the non-linear conversion function. The intermediate object/image plane 26 is common for the first 4f system 21 and the second 4f system 22. The converted image can be used as the object of the second 4f system 22.

Figure 9:
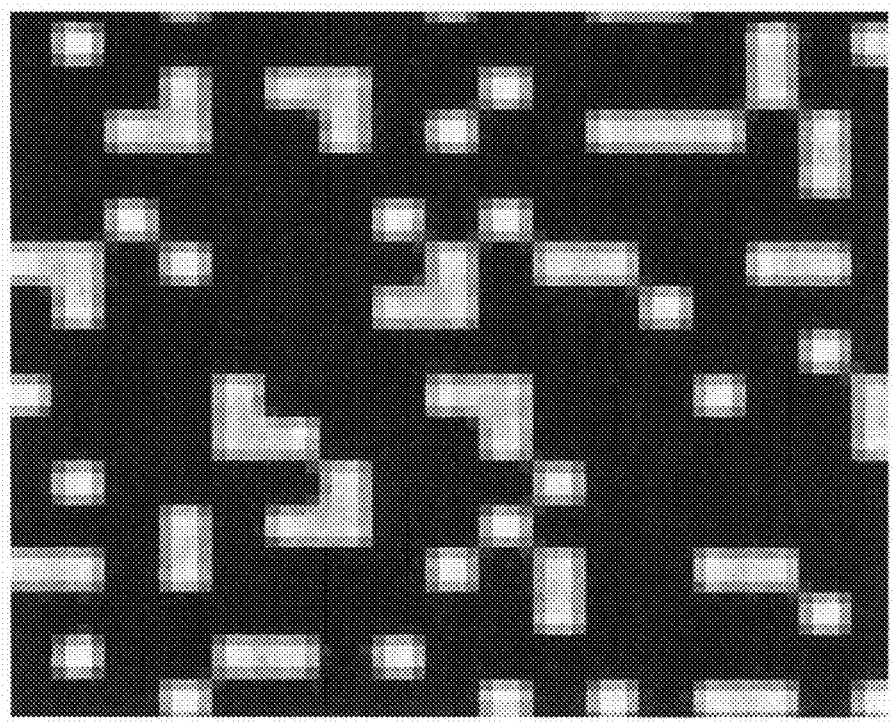
FIG. 9 depicts a low pass filtered and back-transformed image of an amplitude SLM for comparison.

For comparison a low pass filtered and back-transformed image of an amplitude SLM is shown in FIG. 9. For low pass filtering a Fourier filter with the same diameter as DAperture used for calculating FIG. 8 was employed. Thus the hologram diameter, and as a consequence the capacity of a single hologram, are the same in both cases. As can be seen, the intensity distributions of the back-transformed images are similar for the amplitude SLM and the phase SLM 6 using the phase contrast method. The image in FIG. 9 has a slightly higher contrast. However, the decision scheme for the determination of black and white pixels is not sensitive to the contrast. The data are coded into k×k pixel blocks, with k=3, 4 or 5, for example. Every block contains exactly the same number m of white pixels. During reading only the brightest m pixels in the k×k pixel block are considered. The simulation in FIG. 9 uses a constant weight, low white rate code whit 25% white rate. The hologram of the filtered image near the second Fourier plane 27 of the 12f system 20 will be very similar to the hologram of the low pass filtered amplitude SLM. The light distributions after the intermediate object/image plane 26, i.e. in the second and third 4f system 22, 23 are very similar for an amplitude SLM and a phase SLM 6 with the phase contrast method. This means that the same data capacity at a similar level of the bit error rate can be reached, regardless whether an amplitude SLM or a phase SLM is used.

Figure 10:
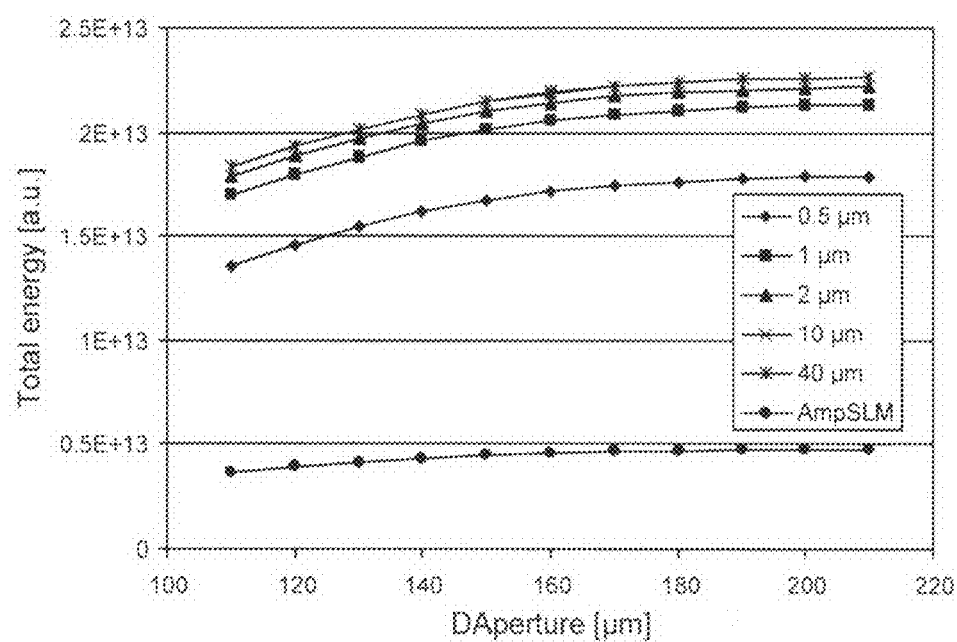
FIG. 10 shows the simulated total energy of the back-transformed image as a function of the diameter of a low pass filtering aperture.

FIG. 10 depicts the simulated total energy (in arbitrary units) of the back-transformed image as a function of the diameter DAperture of the low pass filtering aperture 42 both for the phase SLM 6 and for the amplitude SLM. The parameter of the curves for the phase SLM 6 is the diameter DCentFlt of the inner circular area 41. It is to be noted that the curves for DCentFlt=10 and DCentFlt=40 essentially overlap. From the figure it can be seen that the total energy using the phase SLM 6 is about 4-5 times higher than the total energy using an amplitude SLM with the same conditions. This means that the light efficiency of the phase SLM 6 is about 4-5 times higher than the efficiency of an amplitude SLM. In theory the light efficiency improvement is inversely proportional to the white rate, because in case of an amplitude SLM the black pixels block the light. For the phase SLM 6 the light from the back-transformed black pixels is shifted into the back-transformed white pixels. This means that for the same white rate the writing time of the holograms using a phase SLM with a phase contrast filter is 4-5 times shorter than the writing time with an amplitude SLM.

Figure 11:
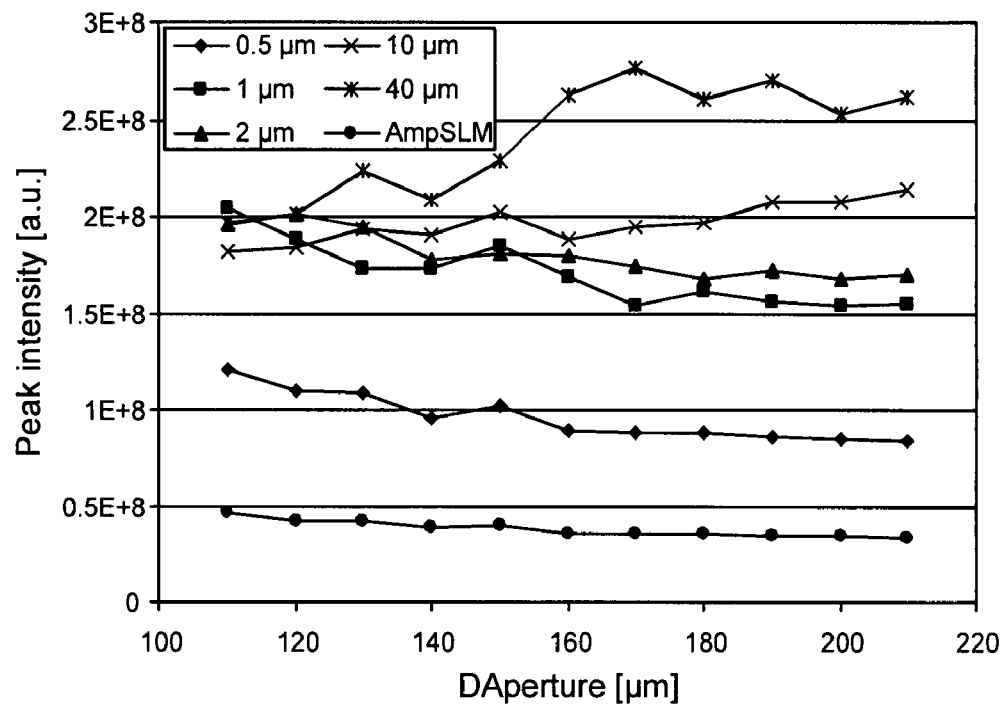
FIG. 11 illustrates the average of the peak intensities of the back-transformed white pixels as a function of the diameter of the low pass filtering aperture.

The average of the peak intensities (in arbitrary units) of the back-transformed white pixels is shown in FIG. 11 as a function of the diameter DAperture of the low pass filtering aperture both for the phase SLM 6 and for the amplitude SLM. The parameter on the curves of the phase SLM 6 is the diameter DCentFlt of the inner circular area 41. From the figure it can be seen that the peak intensities of the back-transformed white pixels are 2-5 times higher for the phase SLM 6 than for the amplitude SLM, depending on the diameter DCentFlt of the inner circular area 41. This also indicates that the writing time of the holograms with a phase SLM 6 is shorter than the writing time with an amplitude SLM.

Figure 12:
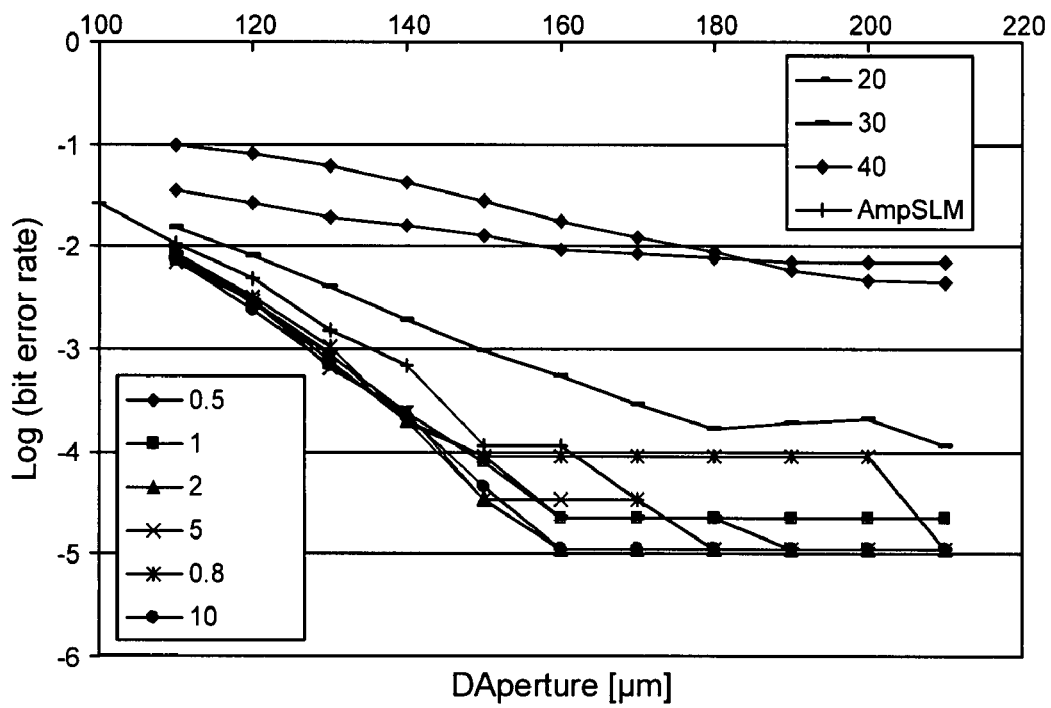
FIG. 12 shows the bit error rate in dependence on the diameter DAperture of the ring type region.
Figure 13:
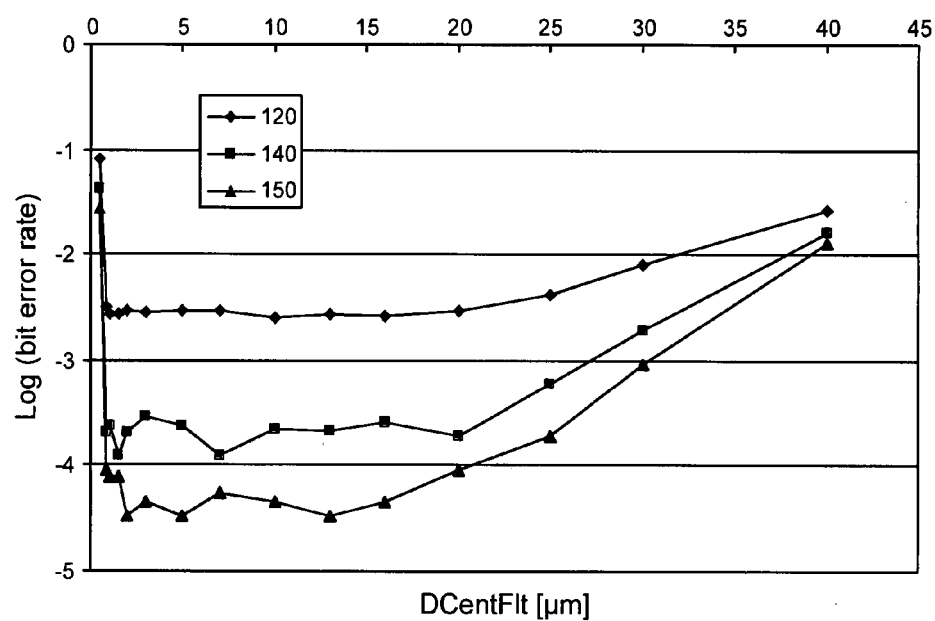
FIG. 13 shows the bit error rate in dependence on the diameter DCentFlt of the central filter.

FIGS. 12 and 13 illustrate how to obtain the appropriate values for DAperture and DCentFlt based on exemplary simulations. From the numerical simulation the bit error rate is calculated as a function of DCentFlt and DAperture. FIG. 12 shows the results of such a numerical simulation. The upright axis is the bit error rate in logarithmic scale, the horizontal axis is the diameter DAperture in microns. The parameter on the curves is the diameter DCentFlt of the central filter in microns. As can be seen, for the simulated holographic storage system the best results for the bit error rate are obtained for a diameter DCentFlt between 1 µm and 20 µm. The bit error rate is the same as or better than the bit error rate obtained with an amplitude SLM.

FIG. 13 shows the bit error rate in dependence on the diameter DCentFlt of the central filter. The upright axis is the bit error rate in logarithmic scale, the horizontal axis is the diameter DCentFlt in microns. The parameter on the curves is the diameter DAperture in microns. As can be seen, the bit error rate increases only slowly with higher filter diameter, but quickly with a very small filter diameter.

What is claimed is:

1. An apparatus for writing to a holographic storage medium, with a phase SLM for imprinting a 2-dimensional phase data pattern onto an object beam, wherein the apparatus has:
    a common path interferometer for converting the phase data pattern of the object beam into an intensity data pattern, and
    an objective lens for illuminating a reference beam and the object beam with the intensity data pattern into the holographic storage medium.

2. The apparatus according to claim 1, wherein the common path interferometer includes a phase contrast filter with a nonlinear conversion.

3. The apparatus according to claim 2, wherein the phase contrast filter has an inner circular area for shifting the phase of a central part of the Fourier transform of the object beam by a first value, and an annular area surrounding the inner circular area for shifting the phase of an outer part of the Fourier transform of the object beam by a second value.

4. The apparatus according to claim 3, wherein the difference between the first value and the second value amounts to a relative phase shift of '$\pi$'.

5. The apparatus according to claim 2, wherein the phase contrast filter has an outer blocking area for low pass filtering the Fourier transform of the object beam.

6. A method for writing a data pattern to a holographic storage medium, having the steps of:
    imprinting a 2-dimensional phase data pattern onto an object beam using a phase SLM, and
    converting the phase data pattern into an intensity data pattern using a common path interferometer, and
    illuminating a reference beam and the object beam with the intensity data pattern into the holographic storage medium.

7. The method according to claim 6, wherein the phase data pattern is converted into an intensity data pattern by a phase contrast filter with a nonlinear conversion.

8. The method according to claim 7, wherein the phase contrast filter has an inner circular area for shifting the phase of a central part of the Fourier transform of the object beam by a first value, and
    an annular area surrounding the inner circular area for shifting the phase of an outer part of the Fourier transform of the object beam by a second value.

9. The method according to claim 8, wherein the difference between the first value and the second value amounts to a relative phase shift of '$\pi$'.

10. The method according to claim 7, further having the step of low pass filtering the Fourier transform of the object beam.

* * * * *